US008944906B2

(12) United States Patent

Ghaly

(10) Patent No.: US 8,944,906 B2

(45) Date of Patent: Feb. 3, 2015

(54) INTERACTIVE SLOT MACHINE

(76) Inventor: Nabil N. Ghaly, South Huntington, NY (US)

( * ) Notice: Subject to any disclaimer, the term of this patent is extended or adjusted under 35 U.S.C. 154(b) by 1249 days.

(21) Appl. No.: 11/644,027

(22) Filed: Dec. 22, 2006

(65) Prior Publication Data

US 2007/0149277 A1 Jun. 28, 2007

Related U.S. Application Data

(60) Provisional application No. 60/754,032, filed on Dec. 27, 2005.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ............ *G07F 17/3262* (2013.01); *G07F 17/34* (2013.01)

USPC .................. 463/20; 463/21; 463/22; 463/23; 463/24; 463/25

(58) Field of Classification Search

USPC ...................................... 463/20–25; 273/143

See application file for complete search history.

(56) References Cited

U.S. PATENT DOCUMENTS

| | | | | |
|---|---|---|---|---|
| 4,756,531 | A * | 7/1988 | DiRe et al. | 463/18 |
| 6,186,894 | B1 * | 2/2001 | Mayeroff | 463/20 |
| 6,270,411 | B1 * | 8/2001 | Gura et al. | 463/20 |
| 6,322,445 | B1 * | 11/2001 | Miller | 463/13 |
| 6,652,378 | B2 * | 11/2003 | Cannon et al. | 463/20 |
| 2003/0045345 | A1 * | 3/2003 | Berman | 463/20 |
| 2004/0140618 | A1 * | 7/2004 | Fox | 273/292 |

* cited by examiner

*Primary Examiner* — Adetokunbo O Torimiro

(57) ABSTRACT

In a gaming device means for providing the player with interactive features that include at least one of establishing at least one new winning combination of symbols, establishing at least one new pay line, and enabling a player to bet on the occurrence of a specific combination of symbols at a particular pay line for one or a plurality of spins.

20 Claims, 9 Drawing Sheets

INTERACTIVE SLOT MACHINE

This utility application benefits from provisional application of U.S. Ser. No. 60/754,032, filed on Dec. 27, 2005.

BACKGROUND OF THE INVENTION

This invention relates generally to slot machines, also known as coin operated gaming machines, and in particular to a slot machine wherein a player can interact with the machine to define a new winning combination of symbols, a new winning line, and/or to bet on the occurrence of a combination of symbols at a particular winning line for one, or a plurality of spins.

Slot machines are well known, and have been around for many years. Examples of traditional slot machines include gaming devices wherein a plurality of symbols is provided on the periphery of a plurality of rotating reels. The reels are randomly stopped and a win decision is made based on the combination of symbols stopping at a single winning line, or a plurality of winning lines. Video slot machines are also known wherein a micro-processor is used to control the functions performed by the machine and a CRT, or an LCD screen is provided to depict the action of the rotating reels.

However, the prior art of slot machines has a common characteristic of having pre-defined winning combinations of symbols, as well as a pre-defined winning lines (also known in the art as pay lines). While the player could select one or more winning lines prior to the start of game play, to the inventor's knowledge, none of the machines known in the art afford the player an opportunity to define his or her own winning combination of symbols, or to define a new winning line. Also, to the inventor's knowledge, none of the existing machines affords the player an opportunity to bet on the occurrence of a particular combination of symbols, at a specific winning line for one or a plurality of game plays or spins. The gaming device described herein incorporates such interactive new features.

OBJECT OF THE INVENTION

Because it is desirable to offer players a new variety of slot machines based on interactive game play, it is an object of this invention to provide a coin operated gaming device that affords the player an opportunity to define one, or a plurality of new winning combinations of symbols.

It is still an object of this invention to provide a coin operated gaming device, wherein a player can define a new winning combination of symbols in a specific order, or as a "boxed" set of symbols where the order of the symbols in the set is not required for a winning combination.

It is another object of this invention to provide a slot machine that affords a player an opportunity to define one, or a plurality of new winning lines, i.e., pay lines.

It is a further object of this invention to provide a slot machine, which allows the player to bet on the occurrence a specific combination of symbols, at a specific winning line during one or a plurality of game plays or spins.

It is also an object of this invention to provide a slot machine, which allows a player to bet on the occurrence of an element of a "boxed" winning combination at a specific winning line during one or a plurality of game plays, wherein said "boxed" winning combination consists of all possible combinations of selected symbols without respect to the order of the symbols in the combination.

It is still an object of the present invention to provide a slot machine that affords a player an opportunity to define a new winning combination of symbols, and to calculate and to dynamically indicate to the player the amount of winning payout associated with said new winning combination prior to the activation of the start lever or button.

It is another object of this invention to provide a coin operated gaming machine, which incorporates a variety of visual and audible indications to heighten the enjoyment of play.

SUMMARY OF THE INVENTION

The foregoing and other objects of the invention are accomplished by a slot machine that incorporates a plurality of input control mechanisms, including switches, to enable a player to interact with the machine, and define new winning combinations of symbols, and/or new winning lines, i.e., pay lines. The slot machine, also, incorporates a plurality of input control mechanisms, including switches, to enable a player to bet on the occurrence of a specific combination of symbols at a specific winning line for a single game play, a plurality of game plays, or during a bonus game play. These new interactive slot machine features could be implemented on a conventional three, four, or five rotating reel machine, as well as on a video slot machine. Further, these features could be implemented as part of a bonus game to enhance the player's winning chances. For example, in a bonus game, the player would be afforded the opportunity to define multiple winning combinations of symbols for a pre-determined number of free games or spins. Further, the number of free games could be fixed, could be based on the amount of wager deposited by the player or the number of pay lines selected, or could be randomly selected at the start of the bonus game.

Similarly, in an alternate bonus game, the player could be afforded the opportunity to bet on the occurrence of a specific combination of symbols at a particular winning line, or a plurality of winning lines for a pre-determined number of free games or spins. The number of such free games or spins could be fixed, or could be randomly selected at the start of the bonus game.

In accordance with a preferred embodiment of the invention, the above described interactive features are provided for a primary slot machine that employs three rotating reels, nine playing positions, and five winning lines. In addition to the traditional winning combinations of symbols, the player is afforded an opportunity to define up to three additional winning combinations.

To define new winning combinations, the player is provided with an interactive display that consists of an LCD screen, and nine (9) switches. The switches are configured such that a player can select and confirm the individual symbols that form a new winning combination. The player can, also, specify if the new winning combination is boxed, i.e., includes all combinations of selected symbols without regard to the order of the symbols in the combination, or if the symbols in the new winning combination must occur in a specific order. In addition, the player is provided with a separate display that indicates the winning payout corresponding to each new winning combination. Such payout could be calculated by the software program that controls the slot machine based on the odds of occurrence of the newly defined winning combination of symbols. Alternatively, the winning payout information could be fetched from a lookup table stored in the memory of the machine, and which includes the winning payouts for all possible combinations of symbols. After defining the additional winning combinations, the player operates the machine similar to a conventional slot machine, and is credited a designated winning payout upon the occurrence of the new winning combination at a selected or activated pay line.

The preferred embodiment also includes a feature that enables a player to define a new winning line in addition to the five predetermined winning lines. Using a touch screen control, the player is instructed to touch the three playing positions that form the new winning line. Upon confirmation by the player of the new winning line, and upon depositing an additional wager for said line, the player is credited a winning payout in the event a winning combination occurs at the new line. The player can designate any one of the predetermined winning lines as a new line, and in such a case all winnings at that line are doubled.

Further, the preferred embodiment includes a feature that enables a player to bet on the occurrence of a specific combination of symbols, at a particular winning line for a single or a plurality of game plays, or spins. Using a touch screen control, the player first selects the designated winning line by touching the three playing positions included in the line. The player then selects the specific winning combination by identifying the symbols that form the winning combination. In addition, the player can specify if the specific combination is boxed, or if the symbols in the combination must occur in a specific order. This feature could be implemented during normal game play by activating a "special bet" button, and would require the payment of an additional wager. For each wager deposited related to this special bet, the player is awarded a plurality of spins during which the special bet feature is in effect. Obviously, the player must still deposit the normal wager for each spin. If the player is successful, he or she is rewarded with a payout equal to a multiple of the normal payout for the selected winning combination. The exact multiple is determined based on the odds, if the combination is an individual selection of symbols in a specific order, or is boxed, and the number of spins covered by the additional wager. Alternatively, such feature could be implemented as part of a bonus game. For example, the bonus game may consist of a plurality of free games during which each occurrence of the specific combination of symbols, at the selected winning line would result in a credit of the multiple payout to the player.

BRIEF DESCRIPTION OF THE DRAWINGS

These and other more detailed and specific objectives will be disclosed in the course of the following description taken in conjunction with the accompanying drawings wherein.

DESCRIPTION OF THE PREFERRED EMBODIMENT

Figure 1:
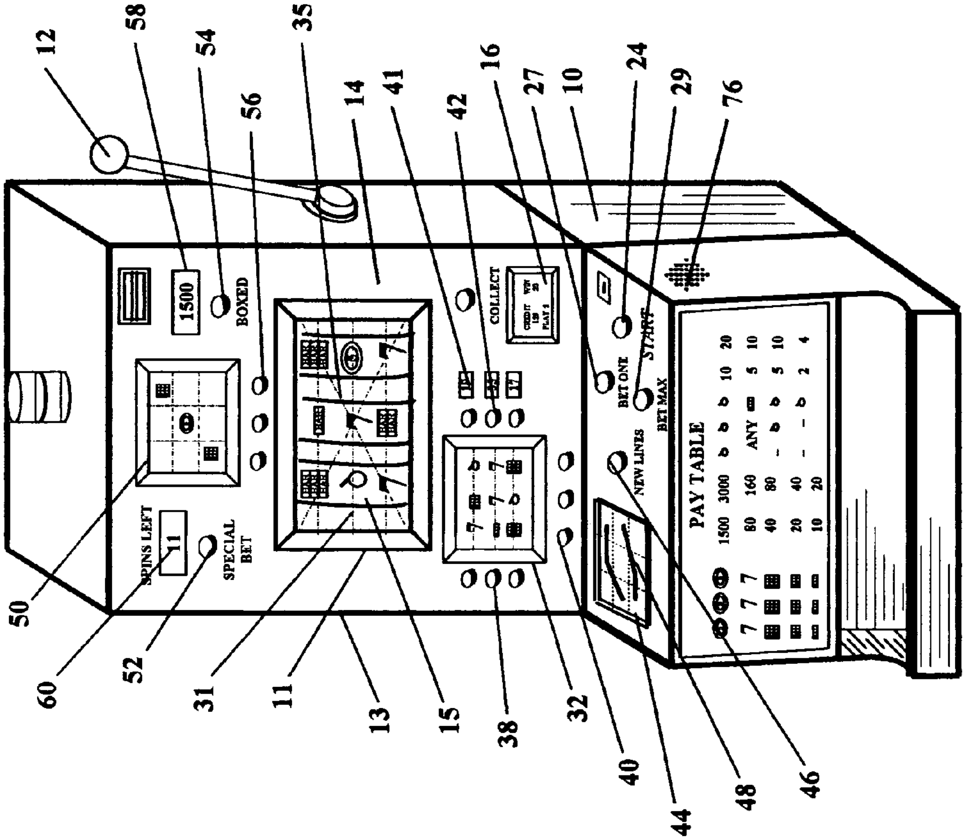
FIG. 1 is a perspective view of the preferred embodiment of an interactive slot machine according to the invention.

Referring now to the drawings where the illustrations are for the purpose of describing the preferred embodiment of the invention and are not intended to limit the invention hereto, FIG. 1 is a front plan view of a slot machine 10 is comprised of a housing 13 having a face 14 and a transparent glass window 11 revealing the three rotating reels 15. The height of the window is such that three positions on each reel are visible to the player. Overall, the symbols at nine playing positions are visible through the glass window when the reels come to a stop. The preferred embodiment provides five predefined winning lines 31 & 35, which are indicated on the surface of the window 11. The winning lines are configured as three horizontal lines 31, and two diagonal lines 35. The slot machine 10, also, has conventional controls including an activation lever 12, an activation "START" button 24, "BET ONE" 27 and "BET MAX" 29 buttons. Further, the preferred embodiment includes a number of indicators, and additional switches to enable a player to use the interactive features of the present invention. A Liquid Crystal Display (LCD) screen 32, which is subdivided into 9 playing positions, and a plurality of switches 38, 40 & 42 are provided to enable a player to define new winning combinations of symbols. Also, a second LCD screen with touch screen controls 44, and a switch 46 are provided to enable a player to define and establish new winning lines 48. In addition, indicators 41 are provided to inform the player of the payout amount corresponding to a new winning combination of symbols. Further, a third LCD screen with touch screen controls 50, and a plurality of switches 52, 54 & 56 are provided to enable a player to place a special bet on the occurrence of a specific winning combination at a particular winning line for one, or a plurality of spins. Two indicators 58 & 60 are also provided to inform the player of the payout amount for the special bet, and the number of spins left. It should be noted that the use of LCD screens for the interactive features is set forth for the purpose of describing the preferred embodiment, and is not intended to limit the invention herein. As would be appreciated by a person skilled in the art, any other type screen, or indicator, could be used. Examples of screen types known in the art include cathode ray tube (CRT), digital light processor (DLP), and plasma screens.

It should also be noted that the concepts described herein could be implemented as a bonus game in a conventional slot machine, or could be incorporated into the primary slot machine as an added feature. Further, these concepts could be used with any set of slot machine symbols. For the purpose of describing the preferred embodiment, the traditional symbols of cherry, single bar, double bar, triple bar, lucky seven, and five multipliers are used. The preferred embodiment enables the player to define up to three new winning combinations of symbols. The player is provided with an LED display 41 for each new combination that indicates the payout amount. Such payout amount is determined dynamically based on the probability of occurrence of the newly defined winning combination, and is calculated by an algorithm that considers the specific symbols selected by the player, the number of new winning combinations selected by the player, and if the boxed feature has been selected by the player.

The control buttons are configured such that three of the buttons 38 are located on a vertical line to the left of the LCD screen 32, three control buttons 40 are located on a horizontal line below the screen 32, and the remaining three buttons 42 are located on a vertical line to the right of the screen 32. Each of the three buttons 38 to the left of the screen is used to select a new winning combination, and confirm the symbols selected for the combination. Each of the buttons 40 below the screen corresponds to a reel, and is used to select a specific symbol for the winning combination. Each of the buttons 42 to the right of the screen corresponds to a new combination, and is used to select if the new combination is boxed. Further, each of the buttons 42 to the right of the screen incorporates an indicator 41 such that the indicator is illuminated if the corresponding new combination of symbols is boxed.

To define a new combination of symbols, the player first activates a button 38 to the left of the screen 32. The player then uses the three buttons 40 below the screen 32 to select the individual symbols for the new combinations. These symbols are displayed on the screen 32 adjacent to the activated button. The player then confirms his or her selection by activating the button 38 to the left of the screen 32 for a second time. The player is then given a choice to box the selected new combination by activating the button 42 at the right of the screen 32, which corresponds to the selected combination. Each time the player modifies the combination, or activates the boxed feature, the LED display 41 corresponding to the new combination informs the player of the winning payout. The above described process is repeated for each new combination defined by the player.

The second new feature provided by this invention is to enable the player to define one, or a plurality of new winning lines, i.e., pay lines. For the purpose of demonstrating the preferred embodiment, the player is limited to one additional winning line. Such new winning line could be any combination of three playing positions, limited to a single playing position per reel, and including any of the five predefined winning lines. To define a new winning line, the player must first activate the "New Line" button 46 located to the right of an LCD screen 44. The player then selects the three playing positions included in the new line by touching the LCD screen 44. Upon finalizing his or her selection, the player must activate the "New Line" button 46 for a second time to confirm his selection.

Once a new winning line is defined by the player, and upon the deposit of an additional wager corresponding to this new line, the player is credited a winning payout if a winning combination occurs at the new line. If the player defines one of the predefined lines as a new winning line, then the winning payouts at that line are doubled.

The third new feature provided by this invention is to afford the player an opportunity for a "special bet," which is defined as betting on the occurrence of a specific combination of symbols, at a particular winning line, for one or a plurality of game plays or spins. The player is provided with a screen 50 with touch controls capability, and a plurality of push buttons to exercise this feature. To place a special bet, the player first activates the "SPECIAL BET" button 52, and then deposits an additional wager to initiate this feature. For the preferred embodiment, each unit wager affords the player three (3) spins of special bet. It should be noted that, for the preferred embodiment, these spins are the regular spins of the main reels 15, and require the deposit of appropriate wagers.

The player is instructed to define the winning line for the special bet by touching the screen 50 at three playing positions to form a valid winning line, i.e., a line limited to one playing position per reel. Each of the buttons 56 below the screen 50 corresponds to a reel, and is used to select a specific symbol for the special bet combination. An additional button 54 to the right of the screen is used to select if the special bet symbol combination is boxed. Further, this additional button 54 incorporates an indicator such that the indicator is illuminated when the player selects the boxed feature. In addition, the preferred embodiment incorporates two indicators to inform the player of the number of spins left 60 in the special bet feature, as well as the payout amount 58 corresponding to said special bet.

It should be noted that the special bet feature could be incorporated as a bonus game, wherein a plurality of free spins are awarded to the player upon the occurrence of a special indicia on the main reels. Prior to initiating the free spins, the player would be required to select a winning line, and a symbol combination for the special bet bonus game.

Figure 2:
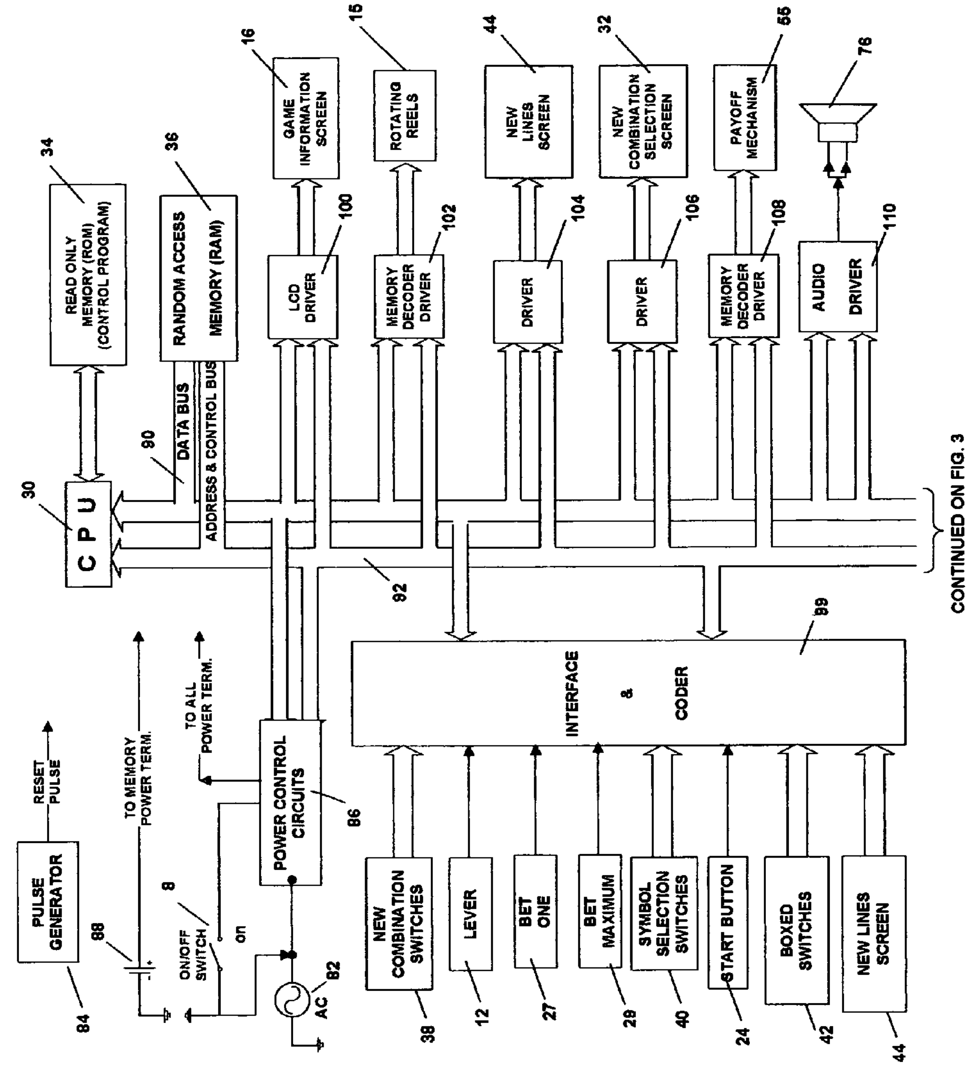
FIGS. 2 & 3 indicate a block diagram of the microprocessor circuitry used to control the interactive slot machine according to the invention.
Figure 3:
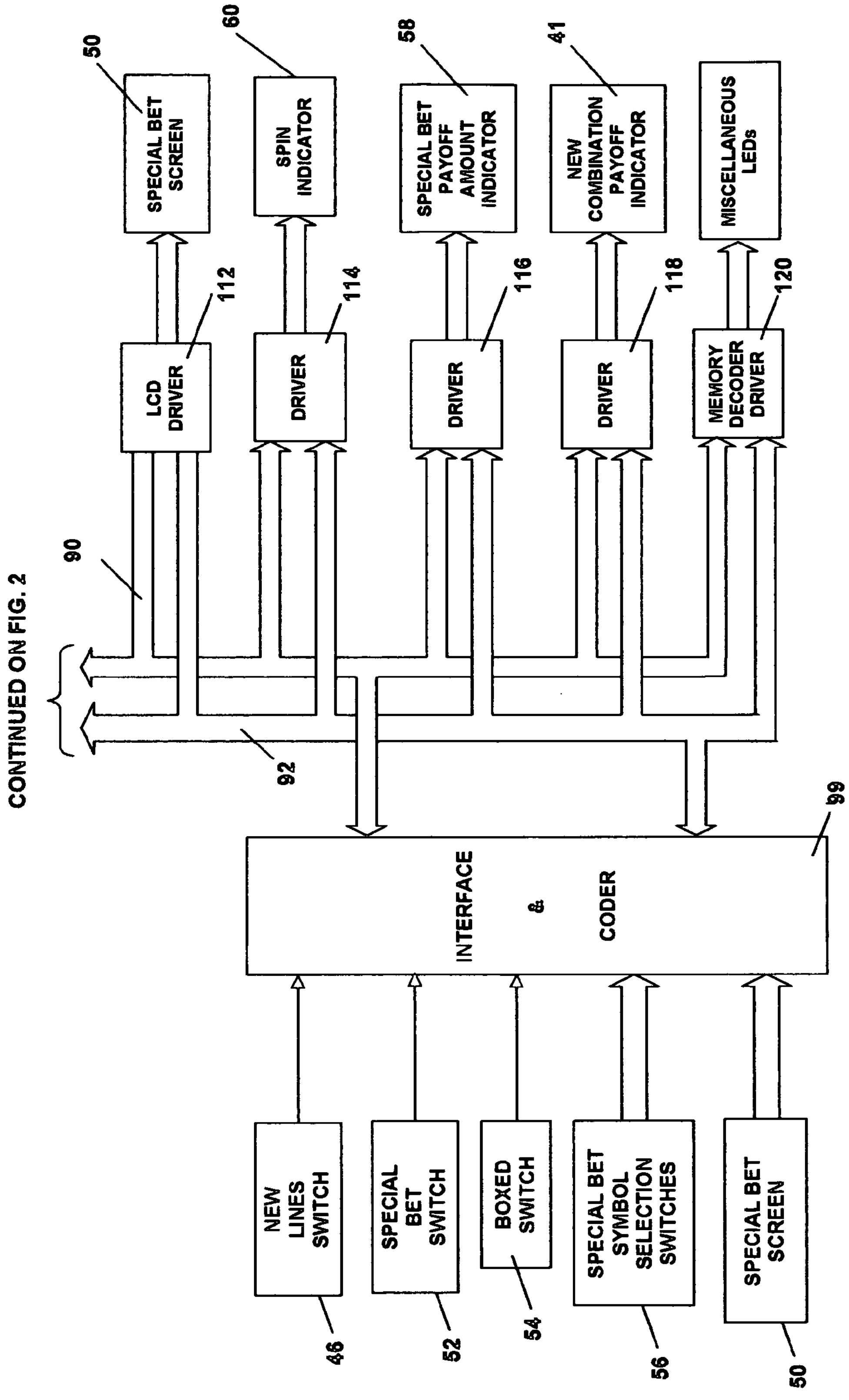
Figure 4:
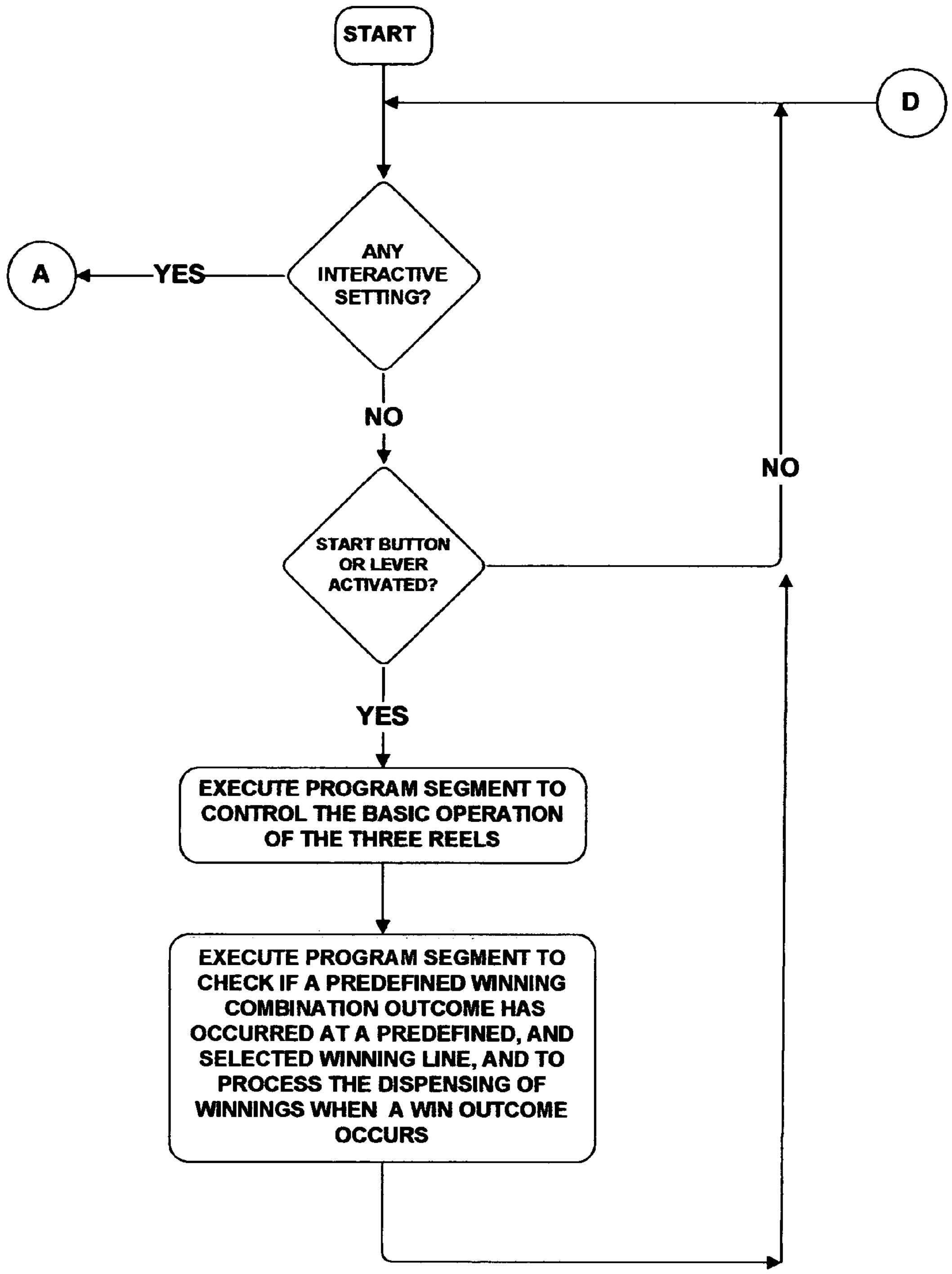
FIGS. 4-9 indicate a logical flow diagram illustrating the main program functions performed by the game code executed on the microprocessor that controls the slot machine according to the invention.
Figure 5:
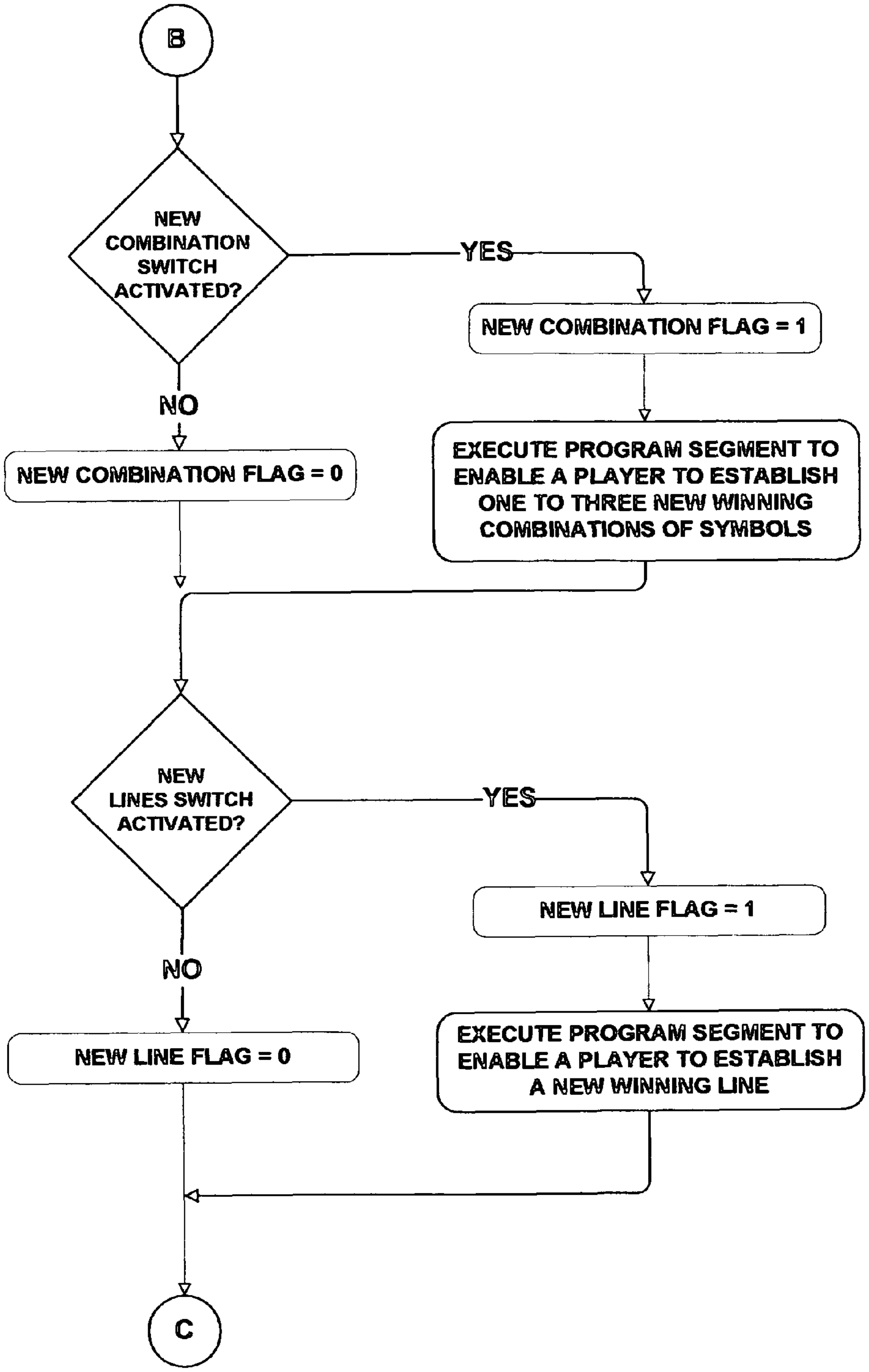
Figure 6:
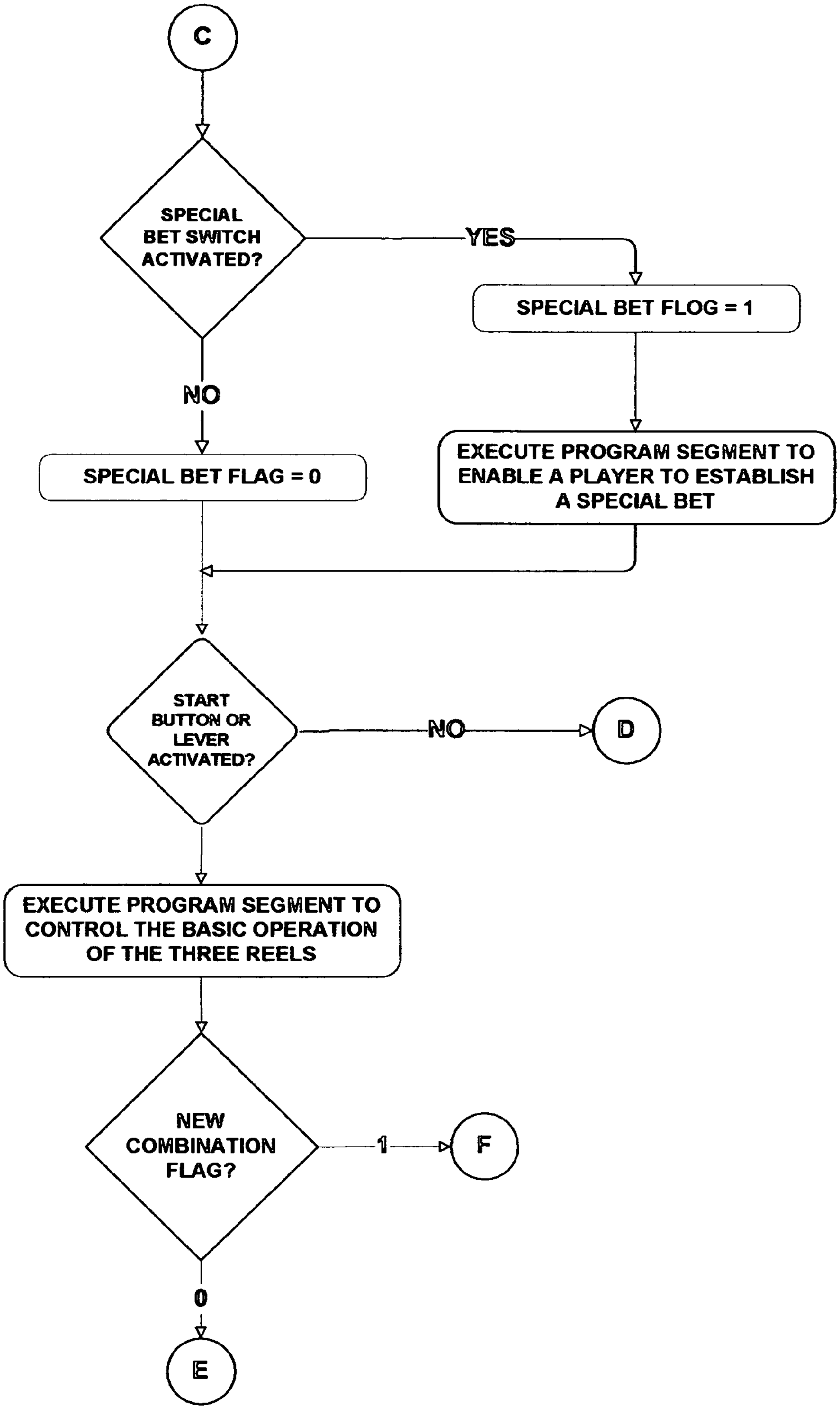
Figure 7:
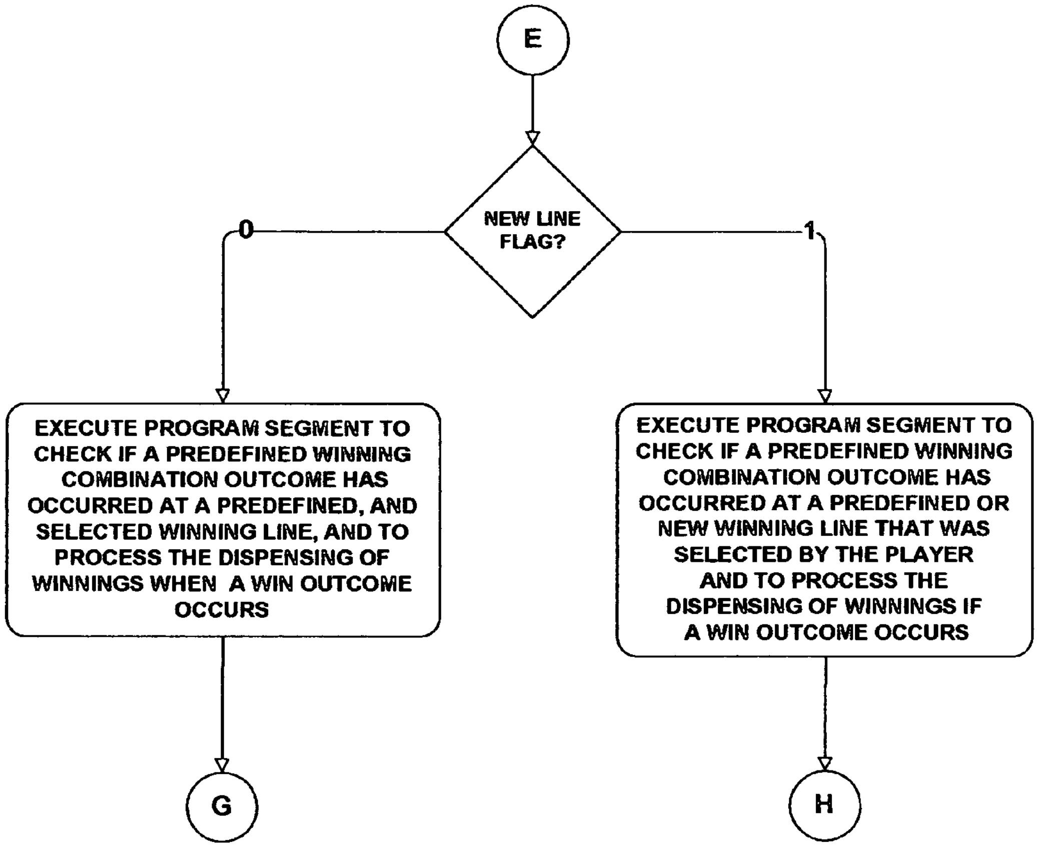
Figure 8:
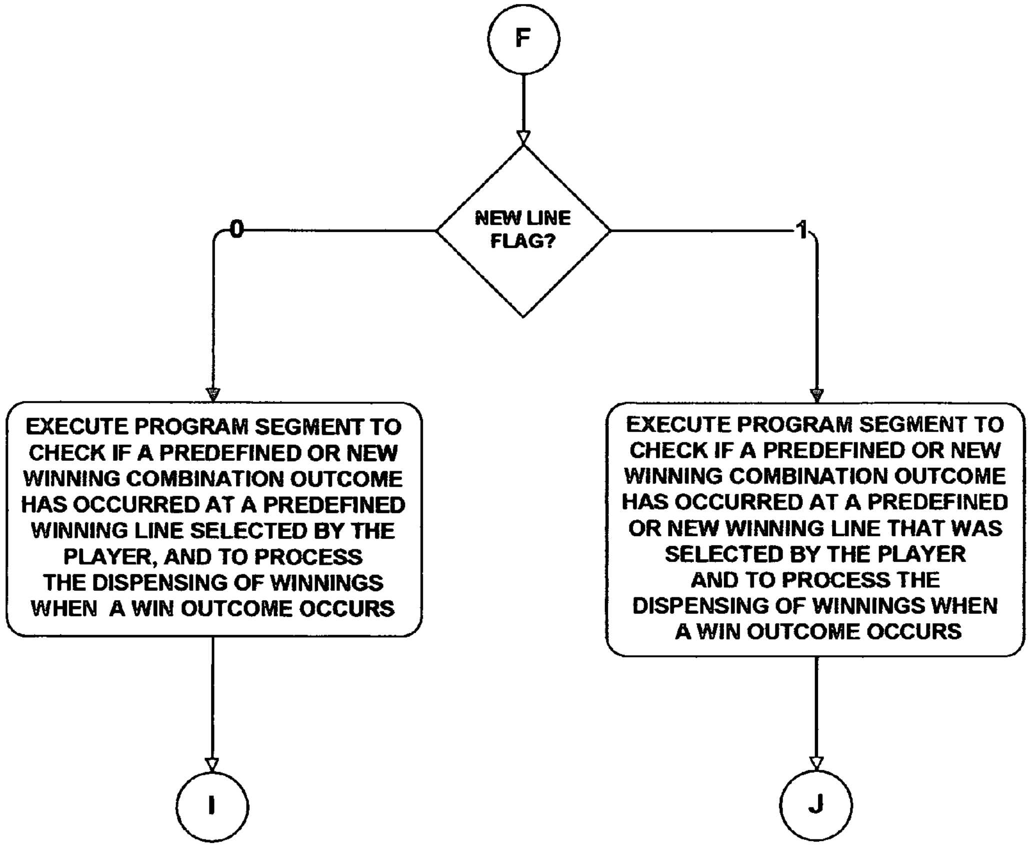
Figure 9:
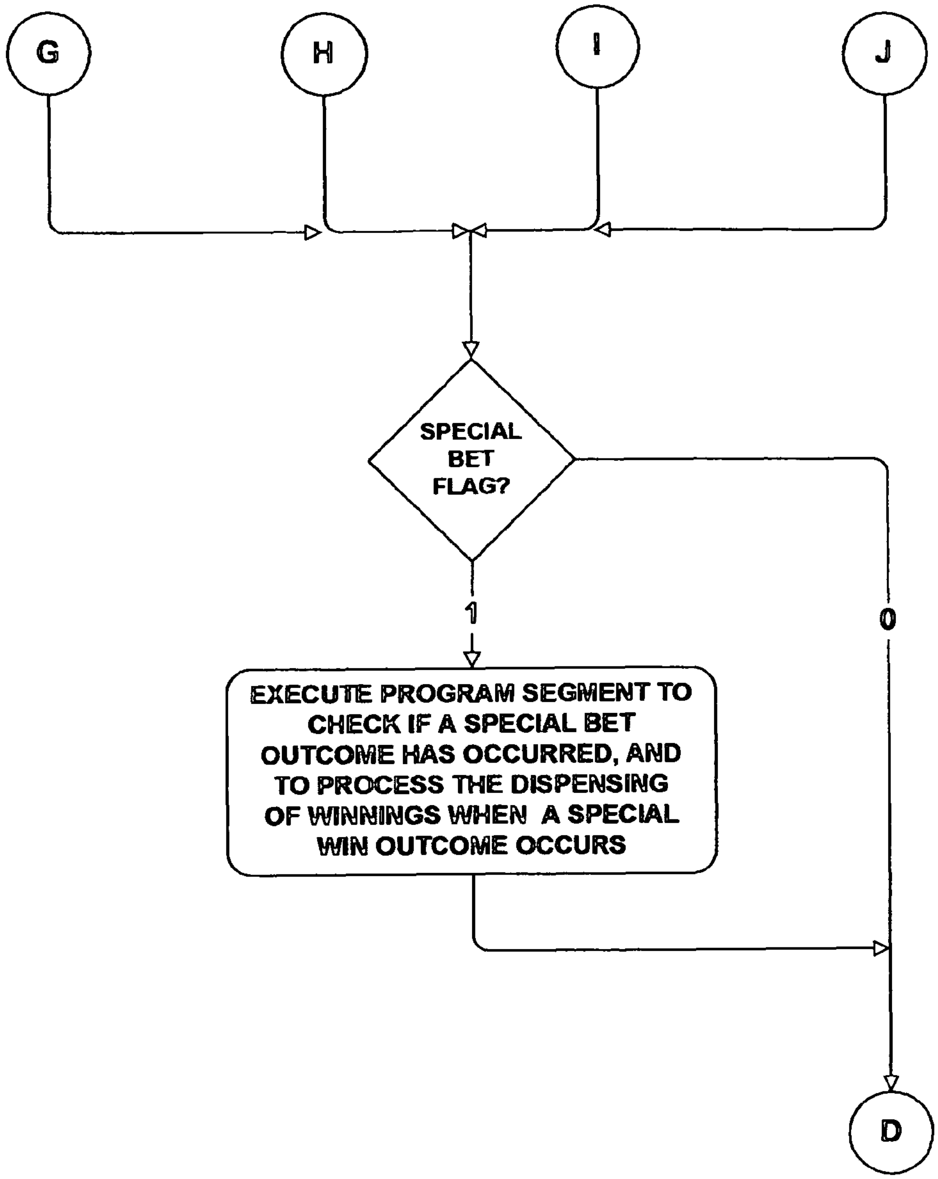

A block diagram of the control circuitry to operate this slot machine 10 is illustrated in FIGS. 2 & 3. This block diagram includes a micro-controller with a central processing unit (CPU) 30 and system memory. The system memory preferably comprises a separate read-only memory (ROM) 34, and battery-backed random-access memory (RAM) 36. It will be appreciated, however, that the system memory may be implemented on any of several alternative types of memory structures or may be implemented on a single memory structure. For example, the read-only memory 34 may be replaced or supplemented with a mass storage unit such as a removable flash memory or a hard drive. The system memory is used to store game-related data associated with the chance games played on the slot machine. The game-related data may, for example, include game code, math tables, a random number generator, and audio resources.

Referring again to FIGS. 2 & 3, in order to operate the slot machine, the ON-OFF switch 8 should be activated from the "off" position to the "on" position, which causes power to be supplied from the main external power supply 82 to the power control circuits 86, which in turn energizes all terminals of the gaming device 10. The slot machine also includes a rechargeable battery 88, which feeds the memory power terminals in order to ensure that critical data is not lost in the event of a loss of the external electrical supply 82. Also, an interface and coding device 99 is used as an input interface between the various control elements and the CPU 30. These control elements include the new-combination switches 38, symbol selection switches 40, new lines switch 46, main lever switch 12, "BET ONE" switch 27, "BET MAX" switch 29, start button 24, boxed switches 42, touch controls for the new line screen 44, special bet switch 52, boxed switch 54, special bet symbol selection switches 56, touch controls for the special bet screen 50, and other conventional control elements of a slot machine. Similarly a plurality of drivers is used to interface the CPU 30 with various output elements of the slot machine. These drivers include a memory decoder driver 102 to interface the CPU 30 with the rotating reels 15. A plurality of screen drivers 100, 104, 106 & 112 is used to interface the CPU 30 with the game information screen 16, the new lines screen 44, the new combination selection screen 32, and the special bet screen 50. Also, a plurality of 114, 116 & 118 is used to interface the CPU 30 with the spin indicator 60, the special bet payoff amount indicator 58, and the new combination payoff indicator 41. Further, an audio driver 110 is used to interface the CPU 30 with a speaker 76. In addition, memory decoder drivers 108 & 120 are used to interface the CPU 30 with the payoff mechanism 55, and various miscellaneous LEDs such as the new lines switch indicator 46, and the special bet switch indicator 52. A common address and control bus 92, and a separate common data bus 90 are used to interconnect the central processing unit 30 with the interface and coding device 99, the various drivers listed above, the read only memory (TOM) 34, and the random access memory (RAM) 36.

It should be noted that the above description of the block diagram illustrated in FIGS. 2 & 3, and using interface and coding devices, and memory decoding devices, is being provided for the purpose of describing the preferred embodiment, and is not intended to limit the invention herein. As would be appreciated by a person skilled in the art, a game designer may elect to use a microprocessor, or a micro-controller that includes input and output ports to interface input switches, and output devices with the CPU, as well as built in video and audio drivers to directly interface the CPU with various screens, and with an audio circuit or speaker. Such microprocessors are well known in the art.

After selecting an amount for the wager, and prior to activating the start lever 21 or button 24, the player may elect to define one or a plurality of new winning combinations of symbols, and/or establish a new winning line, using the interactive switches and screens described herein. Also, the player may elect to place a special bet using the switches and screen described above. In such a case the player is required to deposit an additional wager for a plurality of spins during which the special bet is in effect.

With respect to the detailed operation of this slot machine, the main logic steps utilized are illustrated in flow diagram form in FIGS. 4-9, which interconnect with each other at the places shown in the various figures. Even though specific reference will not be made to this diagram in the following description of the operation of the slot machine, periodic reference to this diagram may prove to be helpful to the reader hereof.

Upon the activation of the "On-Off" switch 8, and the initialization of the program variables, the interactive slot machine is ready to operate. The player may set forth an amount to wager using the "BET ONE" 27 or "BET MAX" 29 buttons. The wager amount is signaled to the CPU 30 by a coin/credit detector. Also the player may elect other game play functions prior to the activation of the start lever 21 or button 24.

This slot machine could be operated as a conventional slot machine, wherein winning combinations of symbols as well as winning lines are predefined. In such a case, and in the absence of activating any of the controls for the new interactive features described herein, the player can activate the start lever 21, or button 24, and will be awarded a payout in the event a winning combination outcome occurs at a selected winning line.

Alternatively, if the player wishes to establish new winning combinations of symbols, establish a new winning line, or place a special bet, then he or she must activate one of the interactive switches 38, 46 & 52 in order to put in effect one or a plurality of the interactive features described herein.

If the player activates any of the new combination switches 38, then the CPU 30 executes a segment of the game code that enables a player to establish up to three new winning combinations of symbols. Said segment of the game code, also, calculates the payout amount corresponding to the new combination, and set the new combination flag to "1." Similarly, if the player activates the new winning lines switch 46, then the CPU 30 executes a segment of the game code that enables a player to establish a new winning line, and will set the new line flag to "1." Further, if the player activates the special bet switch 52, then the CPU 30 executes a segment of the game code that enables a player to establish a special bet, and will set the special bet flag to "1."

Upon the activation of the start lever 21 or button 24, the CPU 30, under the direction of the control program, executes a segment of the game code that employs the states of the above descried flags to select an execute a corresponding segment of the game code, which determines if a winning combination has occurred. For example, if the new combination flag is set to "1," then the CPU 30 will select a game code segment that evaluates the random outcome of the rotating reels using both predefined, and newly defined winning combinations of symbols. Similarly, if the new winning line flag is set to "1," then the CPU 30 will select a game code segment that evaluates the random outcome of the rotating reels based on pre-defined, as well as newly defined winning lines. In the absence of an activation of the start button 24, or lever 12, the control program remains in a holding mode. Also, if the special bet flag is set to "1," then the CPU 30. will select a game code segment that determines if the defined combination of symbols occurred at the selected winning line, and to credit the indicated payout amount upon such occurrence.

Upon the completion of the control program segment that checks, and processes winning combinations, the control program logic returns to the program segment that determines if the player has activated any of the interactive settings, and the above described process is then repeated.

As will be understood by those skilled in the art, many different programs may be utilized to implement the flow charts disclosed in FIG. 4 through FIG. 9. Obviously these programs will vary from one another in some degree. However, it is well within the skill of the computer programmer to provide particular programs for implementing each of the steps of the flow charts disclosed herein. It is also to be understood that the foregoing detailed description has been given for clearness of understanding only and is intended to be exemplary of the invention while not limiting the invention to the exact embodiment shown. Obviously certain modifications, variations and improvements will occur to those skilled in the art upon reading the foregoing. It is, therefore, to be understood that all such modifications, variations and improvements have been deleted herein for the sake of conciseness and readability, but are properly within the scope and spirit of the following claims.

What is claimed and desired to be secured by letters of patent is:

1. In a slot machine that employs a plurality of rotating reels, and which includes at least one predefined pay line, and at least one predefined winning combination of symbols, at least one of means for a player to manually define and activate at least one additional winning combination of symbols that is not predefined, means for a player to manually establish and activate at least one additional pay line that is not predefined, and means for enabling a player to bet on the occurrence of a specific combination of symbols in specific order at a particular pay line.

2. A slot machine as recited in claim 1, further comprising a housing.

3. A slot machine as recited in claim 2, wherein said plurality of rotating reels are implemented by mechanical reels.

4. A slot machine as recited in claim 1, wherein said plurality of rotating reels is implemented by a video display that simulates the movements of said reels.

5. A slot machine as recited in claim 1, further comprising an algorithm that calculates the payout amount corresponding to said additional winning combination of symbols.

6. A slot machine as recited in claim 1, further comprising means for activating a boxed grouping of newly established winning combination of symbols.

7. In a slot machine that employs rotating reels, and which includes at least one predefined pay line, and at least one predefined winning combination of symbols, input control mechanism and control logic executed on a processor to enable a player to manually define and activate at least one additional winning combination of symbols, which is not predefined.

8. A slot machine as recited in claim 7 further comprising a housing.

9. A slot machine as recited in claim 8, wherein said plurality of reels is implemented by mechanical reels.

10. A slot machine as recited in claim 7, wherein said plurality of rotating reels is implemented by a video display that simulates the movements of said reels.

11. A slot machine as recited in claim 7, further comprising an algorithm that calculates the payout amount corresponding to said additional winning combination of symbols.

12. A slot machine as recited in claim 7, further comprising means for activating a boxed grouping of newly established winning combination of symbols.

13. A slot machine comprising:

a housing, a plurality of reels, at least one predefined pay line, at least one predefined winning combination of symbols, a plurality of switches, a control program executed on a processor to control the operation of the slot machine, and a computer program segment that enables a player to manually define and activate at least one additional winning Combination of symbols that is not predefined.

14. A slot machine as recited in claim 13, wherein said plurality of symbols is implemented by mechanical reels.

15. A slot machine as recited in claim 13, wherein said plurality of symbols is implemented by a video display that simulates the movements of said reels.

16. A slot machine as recited in claim 13, further comprising an algorithm that calculates the payout amount corresponding to said additional winning combination of symbols.

17. A slot machine as recited in claim 13 further comprising means for activating a boxed grouping of newly established winning combination of symbols.

18. In a slot machine that includes a plurality of reels, at least one predefined pay line, at least one predefined winning combination of symbols, a housing, and a control program executed on a processor to control the operation of the slot machine, an interactive feature comprising:

a switch to enable a player to activate the feature, and a control program segment that is activated by said switch, and which enables a player to manually define and activate at least one additional winning combination of symbols which is not predefined.

19. A slot machine as recited in claim 18 further comprising means for activating a boxed grouping of newly established winning combination of symbols.

20. A slot machine as recited in claim 18 further comprising a control program segment that enables a player to manually define and activate an additional pay line that is not predefined.

* * * * *